US012003911B2

(12) United States Patent
Graham et al.

(10) Patent No.: US 12,003,911 B2
(45) Date of Patent: Jun. 4, 2024

(54) SYSTEM FOR POWER CONSUMPTION BALANCING IN WIRELESS EARBUDS

(71) Applicant: Hewlett-Packard Development Company, L.P., Spring, TX (US)

(72) Inventors: John S. Graham, Santa Cruz, CA (US); Mingqi Wu, Suzhou (CN); Shoubo Feng, Suzhou (CN)

(73) Assignee: Hewlett-Packard Development Company, L.P., Spring, TX (US)

( * ) Notice: Subject to any disclaimer, the term of this patent is extended or adjusted under 35 U.S.C. 154(b) by 126 days.

(21) Appl. No.: 17/530,254

(22) Filed: Nov. 18, 2021

(65) Prior Publication Data

US 2023/0139601 A1    May 4, 2023

(30) Foreign Application Priority Data

Nov. 1, 2021    (CN) .......................... 202111282991.3

(51) Int. Cl.
  *H04R 1/10*    (2006.01)
  *G06F 1/3212*  (2019.01)
  *H04R 5/033*   (2006.01)

(52) U.S. Cl.
  CPC ......... *H04R 1/1041* (2013.01); *G06F 1/3212* (2013.01); *H04R 5/033* (2013.01)

(58) Field of Classification Search
  CPC ...... H04R 1/1041; H04R 5/033; G06F 1/3212
  USPC .......... 381/74, 328, 322; 320/134, 136, 127, 320/137, 149, 162; 455/560, 439
  See application file for complete search history.

(56) References Cited

U.S. PATENT DOCUMENTS

| 9,516,698 | B2 | 12/2016 | Schmandt et al. |
| 9,729,955 | B2 | 8/2017 | Tan |
| 10,203,713 | B2 | 2/2019 | Kopp et al. |
| 2011/0158441 | A1 | 6/2011 | Batra |
| 2013/0316642 | A1 | 11/2013 | Newham |
| 2016/0219358 | A1 | 7/2016 | Shaffer et al. |
| 2017/0264987 | A1 | 9/2017 | Hong et al. |
| 2017/0311105 | A1 | 10/2017 | Hariharan et al. |
| 2020/0128617 | A1 | 4/2020 | Xian et al. |
| 2020/0196372 | A1 | 6/2020 | Ouyang et al. |

FOREIGN PATENT DOCUMENTS

| CN | 105578335 A | 5/2016 |
| CN | 111669679 A | 9/2020 |

*Primary Examiner* — Vivian C Chin
*Assistant Examiner* — Con P Tran
(74) *Attorney, Agent, or Firm* — Quarles & Brady LLP

(57) ABSTRACT

A first earbud configured to communicate with a user media device and a second earbud. The first earbud includes a battery, a battery monitor configured to determine a power level of the battery, a mode controller. The mode controller is configured to receive a first power level value from the battery monitor and a second power level value from the second earbud and make a determination that the first earbud is operating in a primary mode in which the first earbud receives audio data from the user media device and transmits the received audio data to the second earbud. The mode controller is further configured, in response to the determination that the first earbud is operating in the primary mode, switch the first earbud from the primary mode to a secondary mode based on at least one of the first power level and the second power level.

20 Claims, 5 Drawing Sheets

SYSTEM FOR POWER CONSUMPTION BALANCING IN WIRELESS EARBUDS

CROSS REFERENCE TO RELATED APPLICATIONS

This application claims benefit under 35 U.S.C. § 119(a) to Chinese Application Serial Number 202111282991.3 filed on Nov. 1, 2021, which is incorporated by reference herein in its entirety.

BACKGROUND

Wireless earbuds are in common use with mobile phones and other communication devices. The small form factor and lack of entangling wires make the wireless earbuds widely popular. But wireless earbuds do have drawbacks. The small size of an earbud means that battery size is limited, so earbuds can run out of power relatively quickly. A challenge exists in managing the battery power of the earbud.

SUMMARY

In general, In one aspect, one or more embodiments relate to a first earbud configured to communicate with a user media device and a second earbud. The first earbud includes a battery, a battery monitor configured to determine a power level of the battery, a mode controller. The mode controller is configured to receive a first power level value from the battery monitor and a second power level value from the second earbud and make a determination that the first earbud is operating in a primary mode in which the first earbud receives audio data from the user media device and transmits the received audio data to the second earbud. The mode controller is further configured, in response to the determination that the first earbud is operating in the primary mode, switch the first earbud from the primary mode to a secondary mode based on at least one of the first power level and the second power level.

In general, in one aspect, one or more embodiments relate to a method including obtaining a first power level value of a battery of a first earbud and a second power level value from a second earbud and making a determination that the first earbud is operating in a primary mode in which the first earbud receives audio data from a user media device and transmits the received audio data to the second earbud. The method further includes, in response to the determination that the first earbud is operating in the primary mode, switching the first earbud from the primary mode to a secondary mode based on at least one of the first power level and the second power level.

In general, in one aspect, one or more embodiments relate to a system including a first earbud comprising a first battery and a second earbud comprising a second battery. The first earbud is configured to obtain a first power level value of the first battery, receive, from the second earbud, a second power level value of the second battery, and make a determination that the first earbud is operating in a primary mode in which the first earbud receives audio data from a user media device and transmits the received audio data to the second earbud. In response to the determination that the first earbud is operating in the primary mode, switching the first earbud from the primary mode to a secondary mode based on at least one of the first power level and the second power level.

Other aspects of the disclosure will be apparent from the following description and the appended claims.

BRIEF DESCRIPTION OF DRAWINGS

Like elements in the various figures are denoted by like reference numerals for consistency.

DETAILED DESCRIPTION

In general, embodiments of the disclosure provide paired earbuds that switch between primary and secondary modes in order to balance power consumption between the batteries in the two earbuds. In primary mode, an earbud receives audio data from a user media device and transmits the received audio data to the second earbud. In secondary mode, the earbud receives the audio data from another earbud. Each earbud monitors the battery level in each earbud and switches roles between primary mode and secondary mode based on the relative battery levels of both batteries.

Figure 1:
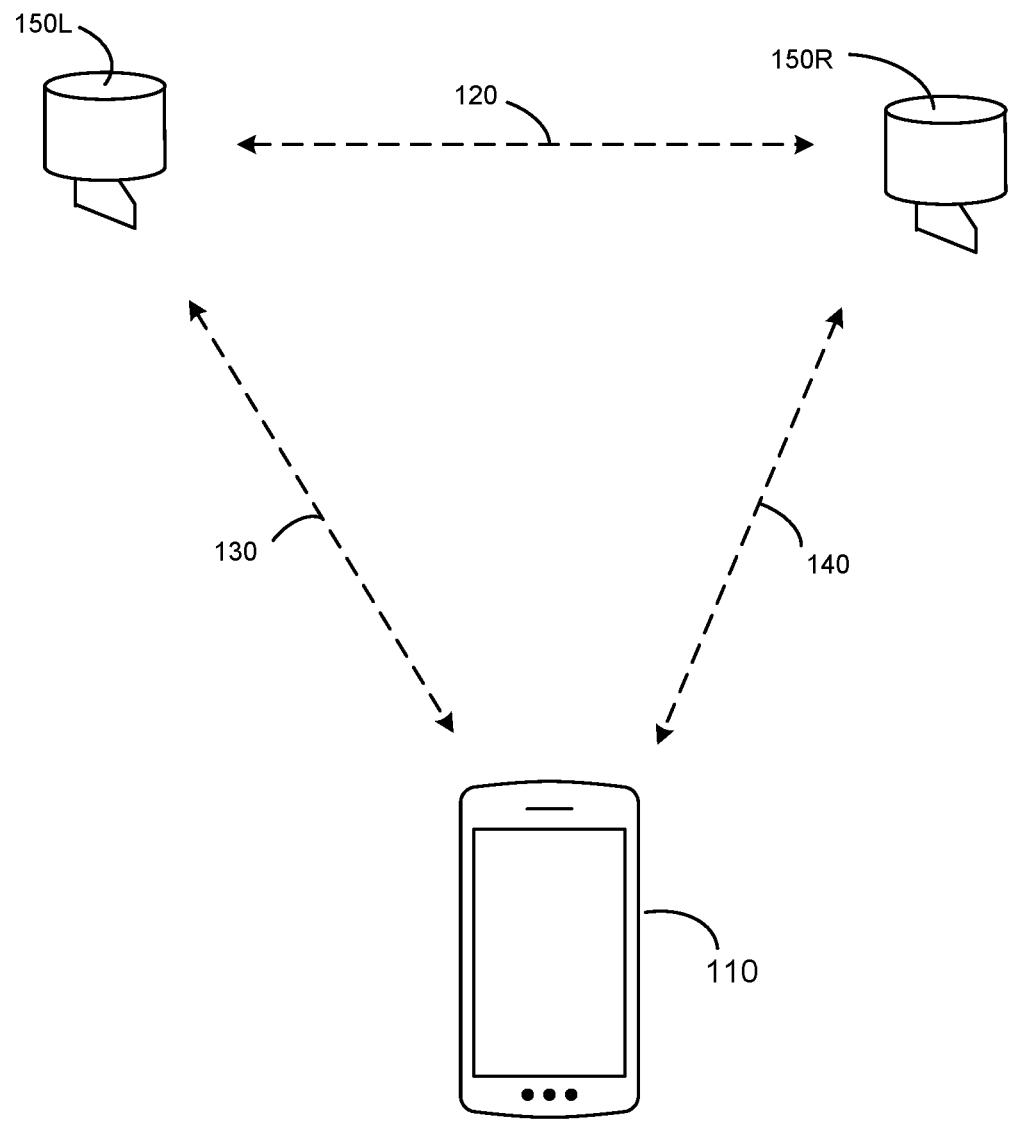
FIG. 1 shows a communications topology between paired earbuds and a user media device, in accordance with one or more embodiments of the disclosure.

FIG. 1 shows a communications topology between paired earbuds 150L and 150R and user media device 110, in accordance with one or more embodiments of the disclosure. In FIG. 1, earbud 150L is the left earbud and earbud 150R is the right earbud. An earbud is a small earphone worn at least partially inside the ear. Also, user media device 110 is represented in FIG. 1 by a smartphone. However, the showing of a smart phone is by way of example only and should not be construed to limit the scope of the disclosure or the claims herein. In general, user media device 110 may be any device capable of communicating with the earbuds 150, including, for example, an audio player, a stereo system, a vehicle infotainment system, a wearable device, a laptop computer, a notepad computer, a neckband device worn by a user, and other types of computing devices.

Communication links 120, 130 and 140 represent several possible two-way wireless communication links between user media device 110 and earbuds 150R and 150L and between earbud 150R and earbud 150L. Communication links 120, 130 and 140 may be any type of wireless communication link, including near field magnetic induction (NFMI), Bluetooth (BT), Bluetooth Low Energy (BLE), or another type of wireless protocol. Thus, communication link 120 between earbuds 150R and 150L may be NFMI, BT, BLE or another protocol. Similarly, communication link 130 between earbud 150L and user media device 110 may be NFMI, BT, BLE or another protocol, and communication link 140 between earbud 150R and user media device 110 may be NFMI, BT, BLE or another protocol Communication link 130 transmits and receives audio data between user media device 110 and earbud 150L and also transmits and receives commands and status data between user media device 110 and earbud 150L. For example, user media device 110 may transmit streaming audio data to earbud 150L over communication link 130 when the user is listening to music. During a phone call between the user and a remote party, user media device 110 may receive voice audio data of the user from earbud 150L and transmit voice audio data of the remote party to earbud 150L over communication link 130. User media device 110 may also receive on communication link 130 user input commands from earbud 150L, such as a Mute command, a Volume Up/Down command, a Call End command, and the like. Similarly, user media device 110 may also transmit user input commands to earbud 150L, such as a Mute command, a Volume Up/Down command, a Call End command, and the like.

Communication link 140 transmits and receives audio data between user media device 110 and earbud 150R and also transmits and receives commands and status data between user media device 110 and earbud 150R. For example, user media device 110 may transmit streaming audio data to earbud 150R over communication link 140 when the user is listening to music. During a phone call between the user and a remote party, user media device 110 may receive voice audio data of the user from earbud 150R and transmit voice audio data of the remote party to earbud 150R over communication link 140. User media device 110 may also receive on communication link 140 user input commands from earbud 150R, such as a Mute command, a Volume Up/Down command, a Call End command, and the like. Similarly, user media device 110 may also transmit user input commands to earbud 150R, such as a Mute command, a Volume Up/Down command, a Call End command, and the like.

Communication link 120 transmits and receives audio data between earbud 150R and earbud 150L and also transmits and receives commands and status data between earbud 150R and earbud 150L. As will be explained below in greater detail, earbuds 150R and 150L are functionally identical and are each capable of operating in either primary mode or secondary mode.

In one example of primary mode operation, the primary earbud (150L or 150R) conducts most of the communications with user media device 110 and performs other functions, such as digital signal processing (DSP) of the audio streams and active noise cancellation (ANC). By way of example, the primary earbud may perform 4-microphone beam-forming digital signal processing in a situation where each earbud includes two microphones during telephony mode. The DSP in the primary earbud may receive a 2-microphone signal from the secondary earbud over communication link 120 and then perform the 4-microphone beam-forming in the primary earbud.

In an example of secondary mode operation, the secondary earbud 150 communicates mostly with the primary earbud 150 and has very limited communication, if any, with the user media device 110. The secondary earbud 150 does not perform active noise cancellation or most other DSP functions, but instead limits operations mostly to receiving and playing the audio stream received from the primary earbud and providing audio signal received at microphones on the secondary earbud to the primary earbud.

The disparity in the functions performed by the primary earbud 150 and the secondary earbud 150 creates a significant difference in power consumption between the two earbuds 150 during normal operation. As a result, one earbud may become drained and require recharging while the other earbud can still work for some time.

To address this battery drainage disparity, the earbuds 150R and 150L described in this disclosure are capable of switching between primary and secondary modes in a coordinated manner, thereby balancing power consumption between the batteries in the earbuds 150R and 150L. To balance the power consumption, each one of earbuds 150R and 150L implements a dedicated firmware design that monitors battery life in each earbud 150 and switches roles between primary mode and secondary mode based on the battery life statuses of both batteries.

Figure 2:
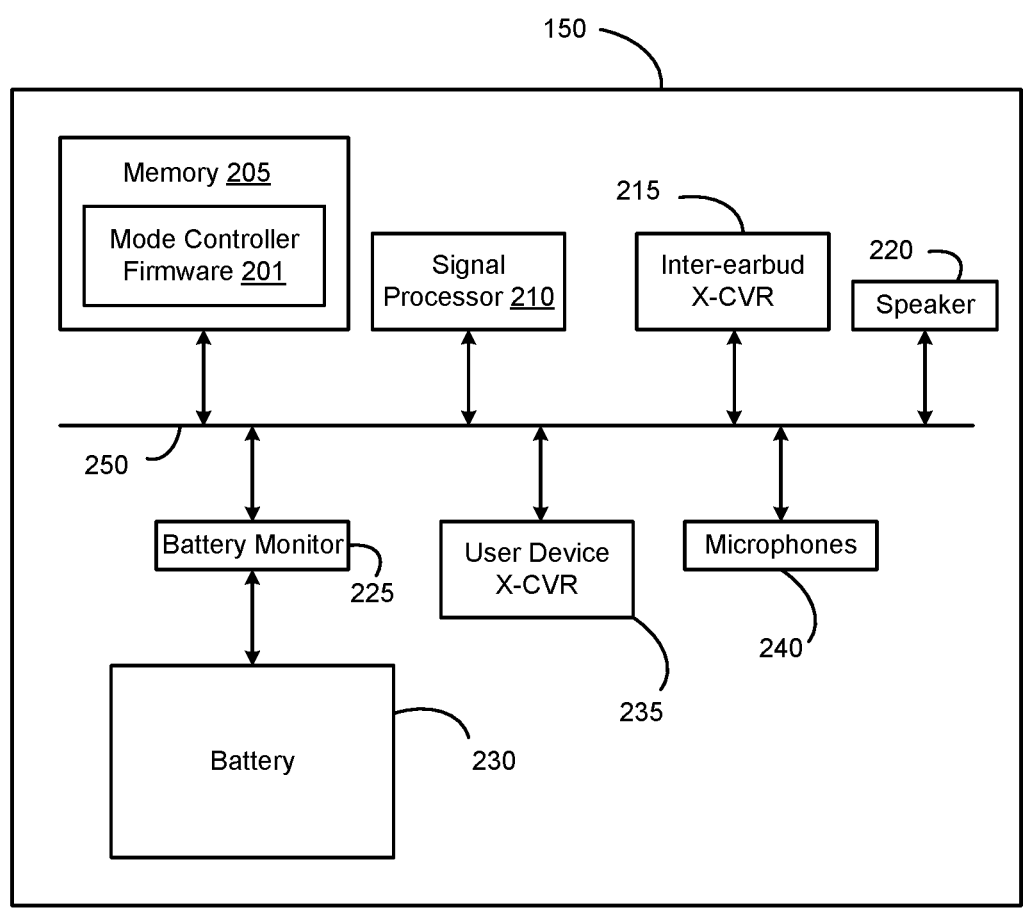
FIG. 2 shows an earbud in accordance with one or more embodiments of the disclosure.

FIG. 2 shows earbud 150 in accordance with one or more embodiments of the disclosure. Because earbuds 150R and 150L are functionally identical, the descriptions of earbud 150 in FIG. 2 applies to both earbud 150R and earbud 150L. Earbud 150 includes memory 205, signal processor 210, inter-earbud transceiver (X-CVR) 215, speaker 220, battery monitor 225, battery 230, user transceiver (X-CVR) 235, one or more microphone(s) 240, and system bus 250. In an exemplary embodiment, system bus 250 enables the other components of earbud 150 to communicate with each other.

Inter-earbud transceiver 215 transmits and receives audio data, commands, and status information between earbud 150 and the other earbud 150 over communication link 120. User device transceiver 235 transmits and receives audio data, commands, and status information between earbud 150 and user media device 110 over communication link 130 or 140. Microphones 240 pick up the voice of the user during telephony mode. Speaker 220 outputs the audio signal during music mode and voice audio during telephony mode. Battery 230 is a rechargeable battery that provides power to all of the components of earbud 150 via a DC power bus (not shown) and a ground bus (not shown). Battery monitor 225 monitors the remaining power (e.g., voltage) on battery 230 and reports the remaining power to the signal processor 210.

Signal processor 210 controls the overall operation of earbud 150 by executing the code of an operating system program (not shown) in memory 205. The operating system program includes mode controller firmware 201, which is a battery power balancing program that enables earbud 150 to operate in primary mode and secondary mode and to switch between modes based on battery status. According to the principles of the present disclosure, signal processor 210 operates as a mode controller by executing the mode controller firmware 201 in order to balance the remaining power levels between the batteries in earbuds 150R and 150L by determining battery levels in both earbuds and switching modes when predetermined threshold values are satisfied. Signal processor 210 may hereafter be referred to as a "mode controller 210" or as simply a "mode controller" in the claims below. Threshold values may be defined in absolute or relative terms. Absolute terms are values that are determinable without additional data (e.g., as a percentage of battery capacity or a predefined battery level). Relative terms are values that are defined relative to a fluctuating value. For example, relative terms may be defined relative to a current battery level (e.g., a percentage of the current battery level of the other earbud). Subsequent thresholds may be less than previous thresholds. In other embodiments, a separate processor (not shown) may operate as a dedicated mode controller that accesses and executes the mode controller firmware 201 in memory 205. In such a case, the separate processor may generate control messages to interrupt signal processor 210 and to initiate mode switching as described herein.

Initially, the user starts using user media device 110, which syncs with earbud 150R and earbud 150L. Either earbud 150 may operate initially as the primary earbud 150. For the following example, earbud 150R initiates as the primary and earbud 150L initiates as secondary. During usage, the battery power level drops in both earbud 150R and earbud 150L and the battery power unbalance gap increases due to the heavier processing load of primary earbud 150R. The gap increase may depend on which functions the user spends more time. Telephony functions consume more power than music streaming, so the power level gap increases more rapidly. The battery power balancing program determines both earbuds battery life and triggers a mode switch if the battery level gap is bigger than a threshold value. The battery power balancing program continues to detect battery life of both earbuds 150R and 150L and repeatedly switches modes of each earbud 150R and 150L to keep the right and left earbuds battery life gap within subsequent threshold values, so that both batteries 230 drains synchronously.

Figure 3:
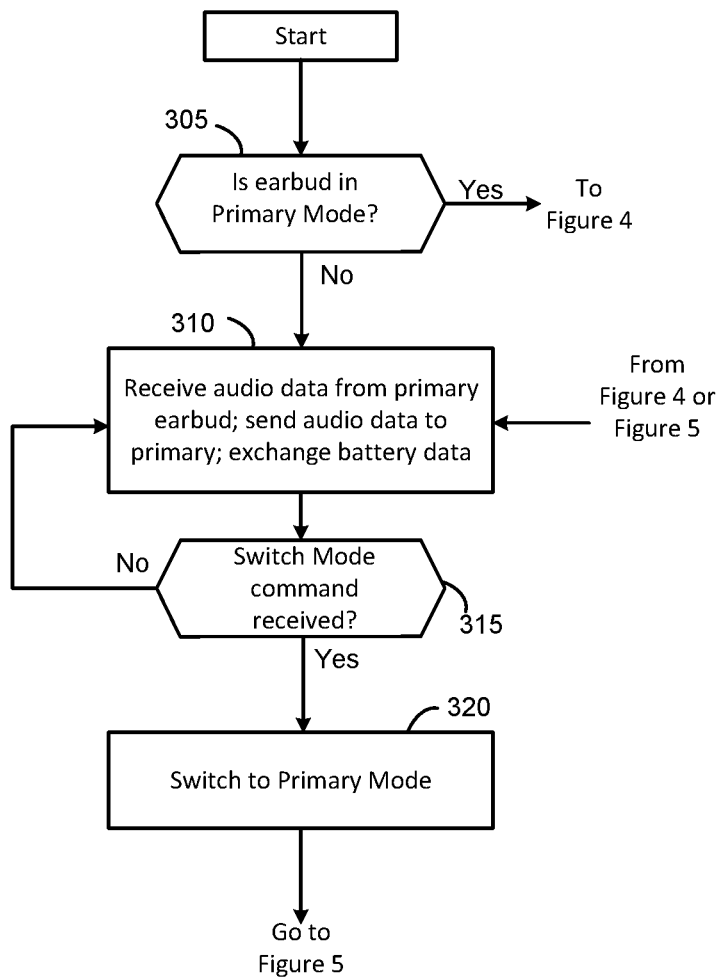
FIG. 3 shows a flow diagram, in accordance with one or more embodiments of the disclosure.

FIG. 3 shows a flow diagram illustrating a method in accordance with one or more embodiments of the disclosure. It is assumed that the method is performed in earbud 150R by signal processor 210, which executes the mode controller firmware 201. It is also assumed in FIG. 3 that the batteries 230 in earbud 150R and in earbud 150L are both initially full charged (i.e., 100% level).

Initially, earbud 150R determines in block 305 whether earbud 150R is in Primary Mode. Earbud 150R may start up in Primary Mode by default or if it initially has a higher battery level than earbud 150L. If Yes in block 305, earbud 150R transfers control to FIG. 4 and begins to operate in Primary Mode. Returning to FIG. 3, if No in block 305, then in block 310 earbud 150R (in Secondary Mode) receives audio data from earbud 150L (in Primary Mode) and sends audio data to earbud 150L. During normal secondary operation, earbud 150R periodically determines in block 315 if a Switch Mode command has been received from earbud 150L (in Primary Mode). If No in block 315, the earbud 150R continues in block 310 to receive audio date from earbud 150L. If Yes in block 315, then earbud 150R switches to Primary Mode in block 320 and earbud 150L switches to Secondary Mode. Earbud 150R then transfers control to FIG. 5 and begins to operate in Primary Mode.

Figure 4:
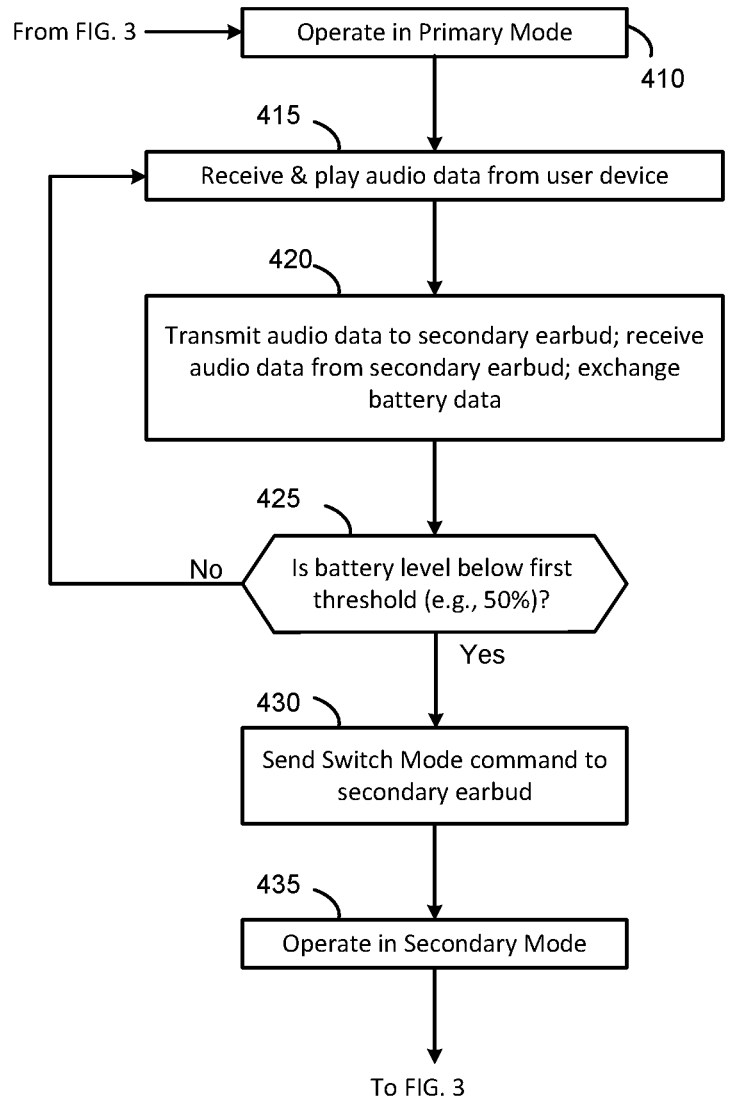
FIG. 4 shows a flow diagram, in accordance with one or more embodiments of the disclosure.

Turning to FIG. 4, FIG. 4 shows a flow diagram illustrating a method executed by a primary mode earbud, in accordance with one or more embodiments of the disclosure. It is assumed that the flow diagram in FIG. 4 is performed in earbud 150R by signal processor 210, which executes the mode controller firmware 201. In block 410, earbud 150R has initiated operating in Primary Mode after exiting block 305 in FIG. 3. Returning to FIG. 4, during routine Primary Mode operation, earbud 150R in block 415 receives and plays audio data from user media device 110. In block 420, earbud 150R also transmits audio data to earbud 150L (in Secondary Mode), receives audio data from earbud 150L, and exchanges battery level status data with earbud 150L. In this manner, each earbud 150R and 150L is aware of the battery power level of the other earbud 150.

Earbud 150R in block 425 periodically (or aperiodically) monitors the power level of battery 230 to determine if the battery power level is below a first threshold value. In one embodiment, the first threshold value may be an absolute value. For example, the first threshold value may be, for example, 50% of full battery power level and represents the first battery power level that triggers a mode switching operation after earbud 150R initiates operations in Primary Mode. In alternate embodiments, the first threshold value may be a relative value compared to the battery level in the earbud 150L. For example, the first threshold value may be when the primary battery level is 50% of the secondary battery level. If No in block 425, earbud 150R continues to perform block 415 and block 420 until the battery level falls below the first threshold value. If Yes in block 425, then earbud 150R in block 430 sends a Switch Mode command to earbud 150L.

In block 435, earbud 150R begins to operate in Secondary Mode and transfers control to block 310 in FIG. 3. Thereafter, earbud 150R operates in Secondary Mode by performing blocks 310 and 315 iteratively until a Switch Mode command is received in block 315. In response to the Switch Mode command, earbud 150R switches to Primary Mode in block 320 and earbud 150L switches to Secondary Mode. Earbud 150R then transfers control to FIG. 5 and begins to operate in Primary Mode.

Figure 5:
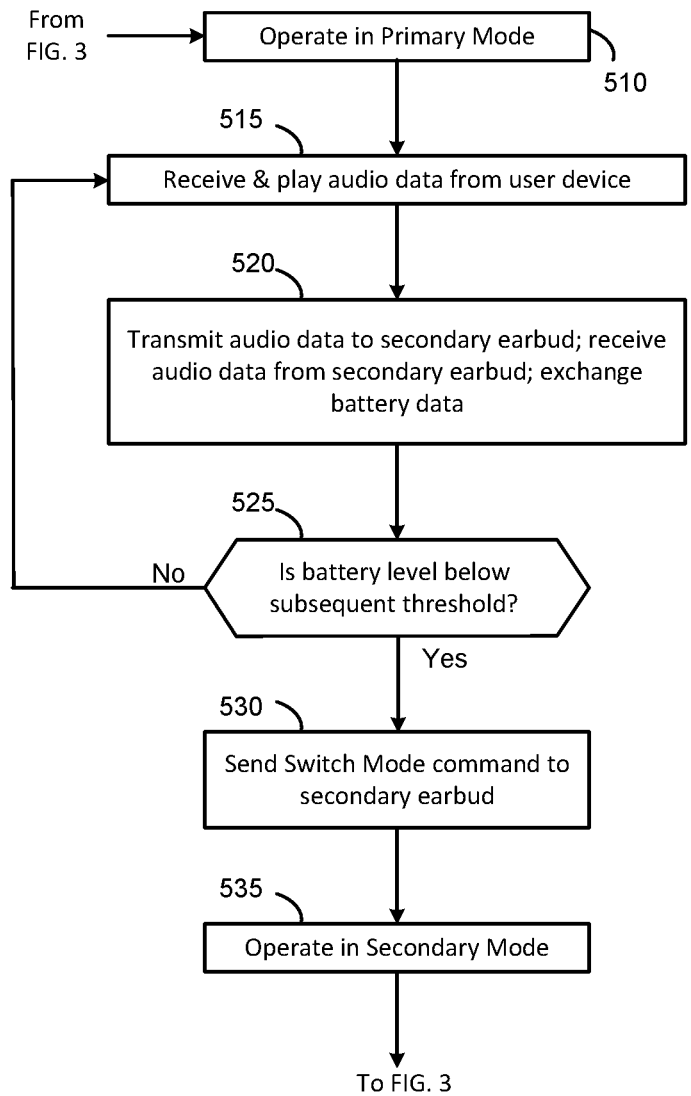
FIG. 5 shows a flow diagram, in accordance with one or more embodiments of the disclosure.

Turning to FIG. 5, FIG. 5 shows a flow diagram, in accordance with one or more embodiments of the disclosure. It is assumed that the flow diagram in FIG. 4 is performed in earbud 150R by signal processor 210, which executes the mode controller firmware 201.

In block 510, earbud 150R has initiated operating in Primary Mode after switching from Secondary Mode and exiting block 320 in FIG. 3. Returning to FIG. 5, during routine Primary Mode operation, earbud 150R in block 515 receives and plays audio data from user media device 110. In block 520, earbud 150R also transmits audio data to earbud 150L (in Secondary Mode), receives audio from earbud 150L, and exchanges battery level status data with earbud 150L. In this manner, each earbud 150R and 150L is aware of the battery power level of the other earbud 150.

Earbud 150R in block 525 periodically or (aperiodically) monitors the power level of battery 230 to determine if the battery power level is below a subsequent threshold value. Since earbud 150R (in Primary Mode) has already been in Secondary Mode, the first threshold level in FIG. 4 has already been reached by earbud 150. The subsequent threshold value is a smaller threshold value than the first threshold level. For example, the subsequent threshold level may be defined in absolute terms (e.g., 30% battery power) or may be a relative value (e.g., 10% below the battery level of the secondary earbud). If No in block 525, earbud 150R continues to perform block 515 and block 520 until the battery level falls below the subsequent threshold value. If Yes in block 525, then earbud 150R in block 530 sends a Switch Mode command to earbud 150L.

In block 535, earbud 150R begins to operate in Secondary Mode and transfers control to block 310 in FIG. 3. Turning to FIG. 3, earbud 150R operates in Secondary Mode by performing blocks 310 and 315 iteratively until a Switch Mode command is received in block 315. In response to the Switch Mode command, earbud 150R switches to Primary Mode in block 320 and earbud 150L switches to Secondary Mode. Earbud 150R then transfers control to FIG. 5 and begins to operate in Primary Mode.

In the detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments of the disclosure, the various disclosed embodiments may be combined in virtually any manner. All combinations are contemplated herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A first earbud configured to communicate with a user media device and a second earbud, the first earbud comprising:
    a battery;
    a battery monitor configured to determine a power level of the battery; and
    a mode controller configured to:
    receive a first power level value from the battery monitor and a second power level value from the second earbud,
    make a determination that the first earbud is operating in a primary mode in which the first earbud receives audio data from the user media device and transmits the received audio data to the second earbud,
    in response to the determination that the first earbud is operating in the primary mode in a first instance, switch the first earbud from the primary mode to a secondary mode based on at least one of the first power level value and the second power level value satisfying a first threshold power value, and
    in response to the determination that the first earbud is operating in the primary mode in a second instance, switch the first earbud from the primary mode to a secondary mode based on at least one of the first power level value and the second power level value satisfying a second threshold power value, wherein the second threshold power value is less than the first threshold power value.

2. The first earbud of claim 1, wherein the mode controller is further configured to:
    determine that the first power level value is less than the first threshold power value and switch the first earbud to the secondary mode in response to a determination that the first power level value is less than the first threshold power value.

3. The first earbud of claim 2, wherein the first threshold power value is defined as an absolute term.

4. The first earbud of claim 3, wherein the mode controller is further configured to transmit to the second earbud, a first switch mode command that causes the second earbud to switch from the secondary mode to the primary mode.

5. The first earbud of claim 4, wherein the mode controller is further configured to:
    receive a second switch mode command from the second earbud, and
    switch, in response to receiving the second switch mode command, the first earbud from the secondary mode back to the primary mode.

6. The first earbud of claim 5, wherein the mode controller is further configured to:
    determine a difference between the first power level value and the second power level value, and
    determine whether the difference is greater than the second threshold power value.

7. The first earbud of claim 6, wherein the mode controller is further configured to switch the first earbud to the secondary mode in response to determining that the difference is greater than the second threshold power value.

8. The first earbud of claim 6, wherein the mode controller switches the first earbud from the secondary mode to the primary mode in response to a switch mode command received from the second earbud.

9. The first earbud of claim 1, wherein the mode controller is further configured to switch the first earbud to the secondary mode in response to a determination that a difference between the first and second power level values is greater than the first threshold power value.

10. The first earbud of claim 1, wherein the mode controller, in response to a determination that the first earbud is operating in the secondary mode, is further configured to switch the first earbud from the secondary mode to the primary mode.

11. A method comprising:
    obtaining a first power level value of a battery of a first earbud and a second power level value from a second earbud;
    making a determination that the first earbud is operating in a primary mode in a first instance in which the first earbud receives audio data from a user media device and transmits the received audio data to the second earbud;
    in response to the determination that the first earbud is operating in the primary mode in the first instance, switching the first earbud from the primary mode to a secondary mode based on at least one of the first power level value and the second power level value satisfying a first threshold power value;
    making a determination that the first earbud is operating in the primary mode in a second instance; and
    in response to the determination that the first earbud is operating in the primary mode in the second instance, switching the first earbud from the primary mode to a secondary mode based on at least one of the first power level value and the second power level value satisfying a second threshold power value, wherein the second threshold power value is less than the first threshold power value.

12. The method of claim 11, further comprising:
    determining that the first power level value is less than the first threshold power value; and
    switching the first earbud to the secondary mode in response to a determination that the first power level value is less than the first threshold power value.

13. The method of claim 11, wherein the first threshold power value is defined as a relative term.

14. The method of claim 13, wherein the first threshold power value is defined in an absolute term.

15. The method of claim 13, further comprising:
    transmitting to the second earbud a first switch mode command that causes the second earbud to switch from the secondary mode to the primary mode.

16. The method of claim 15, further comprising:
    receiving a second switch mode command from the second earbud, and
    switching, in response to receiving the second switch mode command, the first earbud from the secondary mode back to the primary mode.

17. The method of claim 16, further comprising:
determining whether a difference between the first power level value and the second power level value is less than the second threshold power value.

18. The method of claim 17, further comprising:
switching the first earbud to the secondary mode in response to the determination that the difference is less than the second threshold power value.

19. The method of claim 17, further comprising:
switching the first earbud from the secondary mode to the primary mode in response to a switch mode command received from the second earbud.

20. A system comprising:
a first earbud comprising a first battery; and
a second earbud comprising a second battery,
wherein the first earbud is configured to:
obtain a first power level value of the first battery,
receive, from the second earbud, a second power level value of the second battery,
make a determination that the first earbud is operating in a primary mode in a first instance in which the first earbud receives audio data from a user media device and transmits the received audio data to the second earbud,
in response to the determination that the first earbud is operating in the primary mode in the first instance, switch the first earbud from the primary mode to a secondary mode based on at least one of the first power level value and the second power level value satisfying a first threshold power value;
make a determination that the first earbud is operating in the primary mode in a second instance; and
in response to the determination that the first earbud is operating in the primary mode in the second instance, switch the first earbud from the primary mode to a secondary mode based on at least one of the first power level value and the second power level value satisfying a second threshold power value, wherein the second threshold power value is less than the first threshold power value.

\* \* \* \* \*